(12) United States Patent
Conrad et al.

(10) Patent No.: US 8,495,855 B1
(45) Date of Patent: Jul. 30, 2013

(54) DRAPER HEADER WITH PIVOTING CONVEYOR ROLLERS

(75) Inventors: William P Conrad, Bettendorf, IA (US); Chad A Dow, East Moline, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/440,028

(22) Filed: Apr. 5, 2012

(51) Int. Cl.
*A01D 43/00* (2006.01)
(52) U.S. Cl.
USPC .............................. 56/181; 56/208; 56/16.4 R
(58) Field of Classification Search
USPC ............ 56/181, 208, 182, 16.4 R, 14.4, 14.5; 198/813, 814
See application file for complete search history.

(56) References Cited

U.S. PATENT DOCUMENTS

| 2,438,065 | A | * | 3/1948 | Love ................................. 56/303 |
| 3,514,937 | A | * | 6/1970 | Batog .............................. 56/345 |
| 4,956,966 | A | * | 9/1990 | Patterson ......................... 56/181 |
| 5,005,343 | A | * | 4/1991 | Patterson ......................... 56/14.4 |
| 7,448,491 | B1 | * | 11/2008 | Tippery et al. ................ 198/813 |
| 7,472,533 | B2 | * | 1/2009 | Talbot et al. ..................... 56/181 |
| 7,788,891 | B2 | * | 9/2010 | Puryk et al. ..................... 56/181 |
| 8,281,561 | B2 | * | 10/2012 | Dow et al. ........................ 56/181 |
| 2007/0193243 | A1 | * | 8/2007 | Schmidt et al. ................. 56/181 |
| 2007/0204584 | A1 | * | 9/2007 | Coers et al. ..................... 56/15.8 |

* cited by examiner

*Primary Examiner* — Árpád Fábián-Kovács

(57) ABSTRACT

A draper header has an endless belt conveyor supported on two arms that pivot with respect to the frame of the draper header. Both ends of the conveyor belt are supported on the arms such that the ends of the conveyor belt can rotate about respective generally vertical axes to thereby reduce uneven tension across the fore and aft width of the conveyor belt and reduce wear on the conveyor belt.

13 Claims, 3 Drawing Sheets

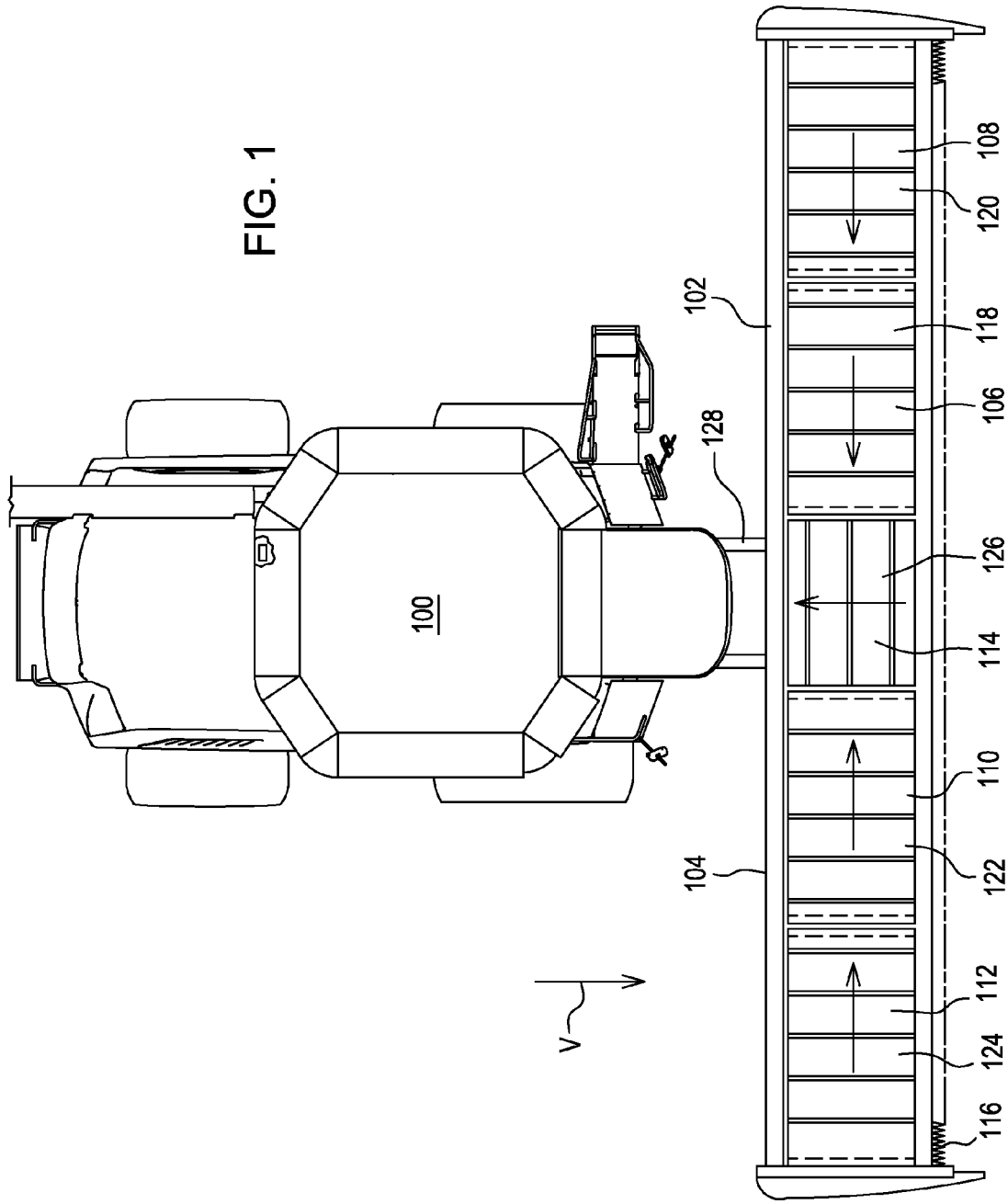

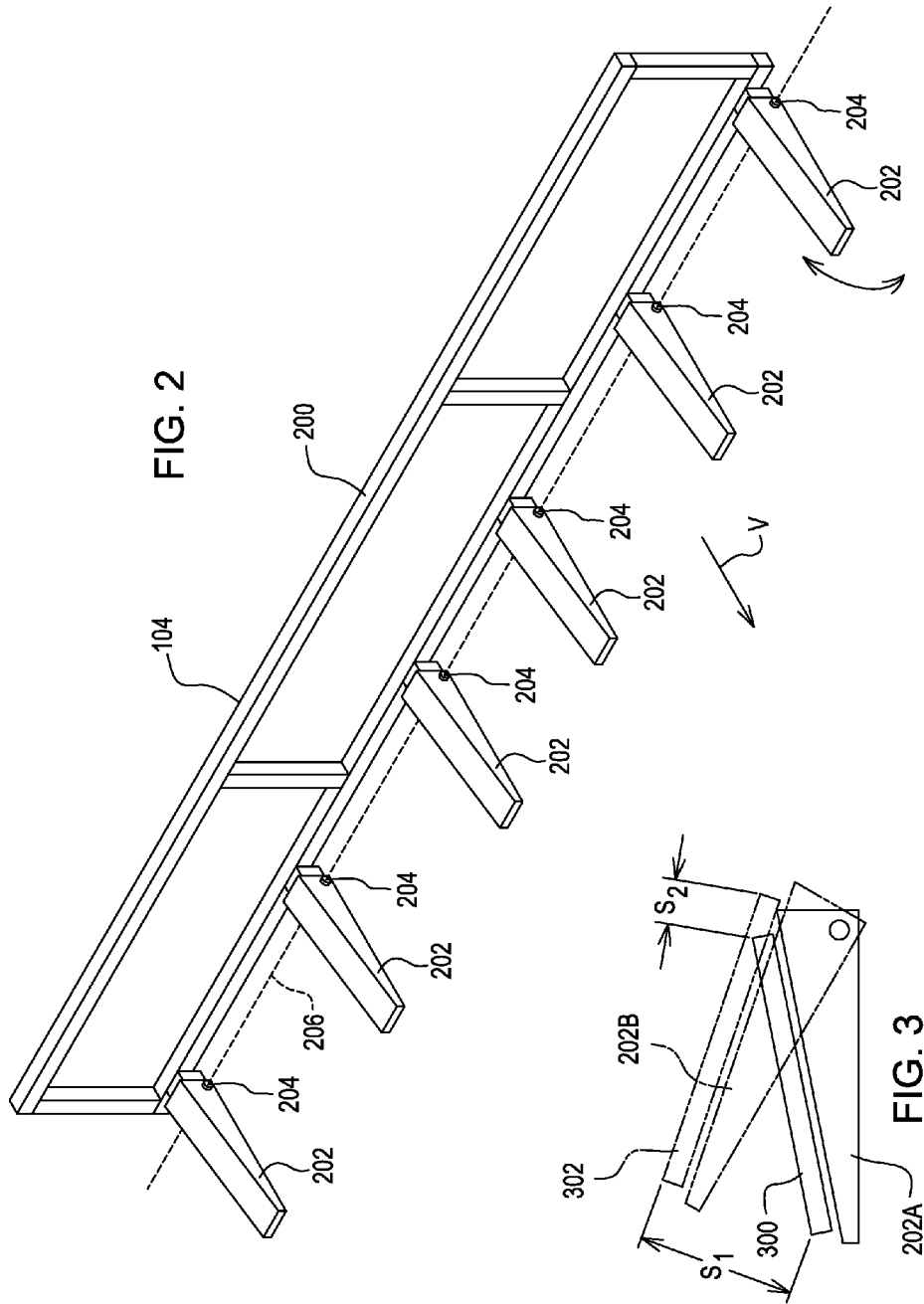

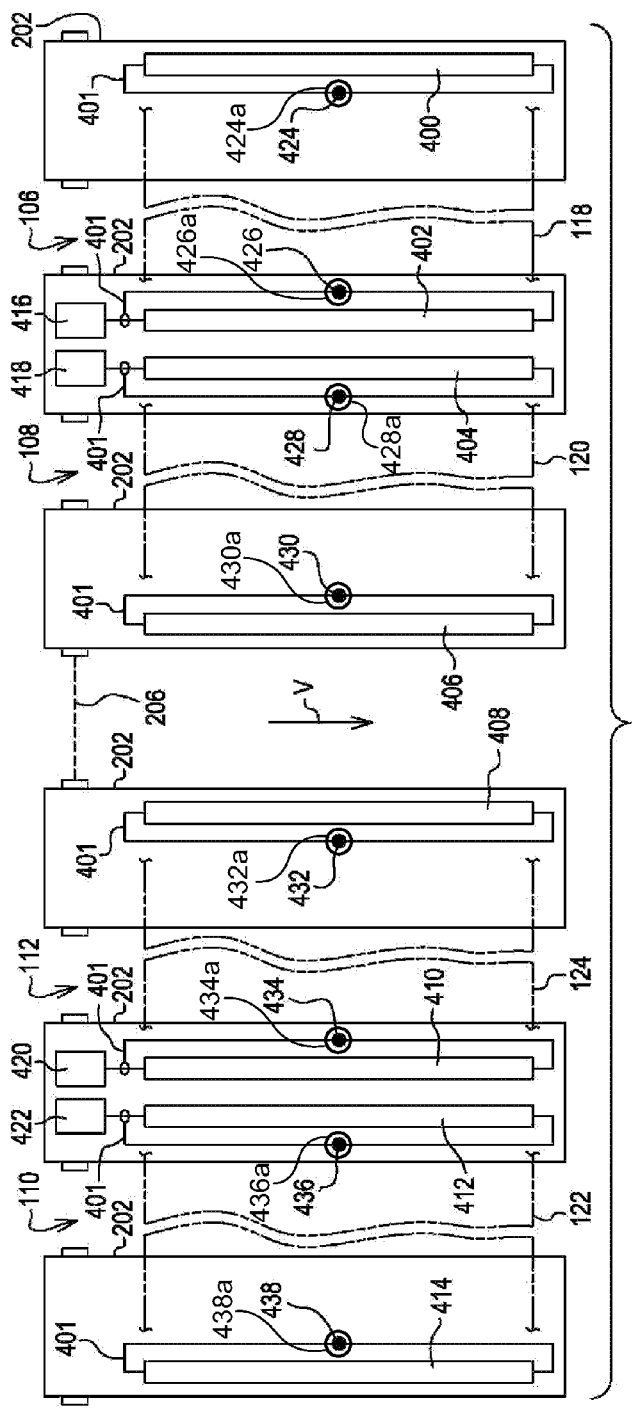
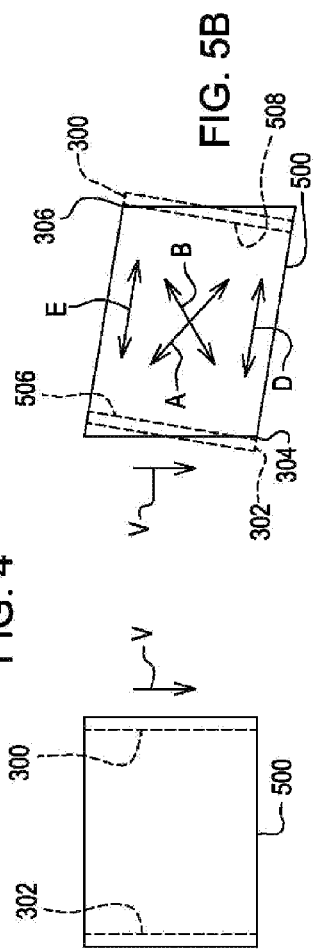
FIG. 4
FIG. 5A
FIG. 5B

DRAPER HEADER WITH PIVOTING CONVEYOR ROLLERS

FIELD OF THE INVENTION

This invention relates to draper headers for agricultural combines. More particularly, it relates to draper headers having endless belt conveyors supported on pivoting arms. Even more particularly, it relates to arrangements for supporting end rollers of the endless belt conveyors.

BACKGROUND OF THE INVENTION

In recent years, engineers have designed draper headers of greater width. As the width of these draper headers increases, they follow the contours of the ground more poorly. As a result, the draper headers do not harvest crop as accurately as older, narrower headers.

One solution to this problem has been to permit the frame of the header to flex by assembling the frame in multiple sections that are hinged to each other.

An alternative solution has been to provide arms that are pivotally coupled to the frame and extend forward from the frame. These arms pivot up and down at their forward ends about their pivotal connection to the frame. The arms are coupled to the cutter bar at their forward ends. This arrangement permits the arms to pivot up and down as the cutter bar follows the contours of the ground even though the frame is rigid.

One drawback to this basic pivoting arm arrangement is excessive conveyor belt wear. The endless belt conveyors are supported on the pivoting arms. With the arms pivoting about the rear of the arms, when an arm supporting one end of the conveyor belt pivots upward, the forward edge of the conveyor belt is highly tensioned and the rear edge of the conveyor belt is not tensioned. This uneven tension across the width of the conveyor belt causes excessive wear of the conveyor belt.

It is an object of this invention to provide an alternative means for suspending the conveyor belts on the float arms that reduces the uneven tension across the width of the conveyor belt and thereby extends the life of the conveyor belts.

SUMMARY OF THE INVENTION

In accordance with one aspect of the invention, a draper header is provided having a frame that extends generally perpendicular to the direction of travel of the draper header. Arms are pivotally coupled to the frame and spaced apart locations across the width of the frame. These arms extend forward from the frame and are coupled at their forward ends to an elongate reciprocating knife extending across the front of the draper header.

As the draper header travels over the ground, ground forces push against skid shoes at the bottom of the cutter bar. This flexes the cutter bar upward and downward and therefore pivots the arms up and down about their pivot points.

Rollers are mounted on adjacent arms to support an endless conveyor belt. This conveyor belt is disposed behind the cutter bar to carry crop by the cutter bar to a central region of the draper. Since the conveyor belt is mounted on rollers that are mounted on pivoting arms, the belt also moves up and down (and twists) when the arms move up and down.

The rollers are arranged such that one roller is located at the inner end and one roller is located at the outer end of the endless belt. The endless belt is supported on these rollers, and is driven by at least one of the rollers, which is coupled to a drive motor.

Each of the rollers is supported on a roller mount that permits the roller to pivot with respect to the arm on which it is mounted about an axis that is oriented generally vertically. This permits any two rollers that support an endless belt to pivot with respect to each other. In particular, it permits any two rollers to pivot in the same direction around their respective pivotal axes, thereby equalizing the tension in the conveyor belt caused by the unequal pivoting of the arms that support the conveyor rollers.

In accordance with another aspect of the invention a draper header is provided including a frame that is elongate and extends laterally; a plurality of arms having a front end and a rear end, wherein each of said plurality of arms extends in a forward direction and is pivotally coupled to the frame at its rear end such that each arm is constrained to pivot up and down at its front end with respect to the frame; a plurality of rollers, wherein each roller of said plurality of rollers has a longitudinal rotational axis, a front end and a rear end, wherein each roller is mounted on a corresponding arm of the plurality of arms to pivot up and down together with the corresponding arm, wherein the longitudinal rotational axis of each roller extends in a generally fore-and-aft direction; a plurality of roller mounts, wherein each roller mount of said plurality of roller mounts is pivotally coupled to the corresponding arm to pivot about a pivotal axis with respect to said arm, and wherein said pivotal axis extends generally vertically and perpendicular to the longitudinal rotational axis; and an endless conveyor belt, wherein said belt has a first end loop wrapped around a first roller of the plurality of rollers and a second end loop wrapped around a second roller of the plurality of rollers, such that the belt is driven about the first roller and the second roller in a direction perpendicular to the direction of travel of the draper header through a field harvesting crops; wherein the first and second rollers are supported on corresponding roller mounts such that the first roller pivots about the roller mount pivotal axis on the arm on which it is mounted and the second roller pivots about the roller mount pivotal axis on the arm on which it is mounted such that both the first and second rollers can simultaneously pivot in the same direction about their respective pivotal axes in the same direction at the same time.

A motor may be drivingly coupled to the rear end of the first roller to drive the first roller in rotation. Each of the plurality of rollers may be configured to pivot together with the roller mount to which it is mounted about the pivotal axis of the roller mount to which it is mounted. The pivotal axis of the first roller may be disposed in a fore-and-aft position between the rear end of the first roller and the front end of the second roller, and the pivotal axis of the second roller is disposed in a fore-and-aft position between the rear end of the second roller and the front end of the second roller. Force applied by the endless conveyor belt to the front end of the first roller may cause the front end of the first roller to pivot toward the second roller, force applied by the endless conveyor belt to the rear end of the first roller may cause the rear end of the first roller to pivot toward the second roller, force applied by the endless conveyor belt to the front end of the second roller may cause the front end of the second roller to pivot toward the first roller, and force applied by the endless conveyor belt to the rear end of the second roller may cause the rear end of the second roller to pivot toward the first roller.

In accordance with another aspect of the invention an agricultural harvester comprises a self-propelled agricultural vehicle; and an agricultural header mounted on the front of the agricultural vehicle, the agricultural header further comprising, a frame that is elongate and extends laterally; a plurality of arms having a front end and a rear end, wherein each of said plurality of arms extends in a forward direction and is pivotally coupled to the frame at its rear end such that each arm is constrained to pivot up and down at its front end with respect to the frame; a plurality of rollers, wherein each roller of said plurality of rollers has a longitudinal rotational axis, a front end and a rear end, wherein each roller is mounted on a corresponding arm of the plurality of arms to pivot up and down together with the corresponding arm, wherein the longitudinal rotational axis of each roller extends in a generally fore-and-aft direction; a plurality of roller mounts, wherein each roller mount of said plurality of roller mounts is pivotally coupled to the corresponding arm to pivot about a pivotal axis with respect to said arm, and wherein said pivotal axis extends generally vertically and perpendicular to the longitudinal rotational axis; and an endless conveyor belt, wherein said belt has a first end loop wrapped around a first roller of the plurality of rollers and a second end loop wrapped around a second roller of the plurality of rollers, such that the belt is driven about the first roller and the second roller in a direction perpendicular to the direction of travel of the draper header through a field harvesting crops; wherein the first and second rollers are supported on corresponding roller mounts such that the first roller pivots about the roller mount pivotal axis on the arm on which it is mounted and the second roller pivots about the pivotal axis of the arm on which it is mounted such that both the first and second rollers can simultaneously pivot in the same direction about their respective pivotal axes in the same direction at the same time.

In accordance with another aspect of the invention, a draper header comprises a frame that is elongate and extends laterally; a first arm having a front end and a rear end, wherein the first arm is pivotally coupled to the frame at the rear end to pivot about a generally horizontal and laterally extending first axis, said first arm extending generally forward from the frame; a first roller mount mounted on the first arm to pivot about a generally vertical second axis with respect to the first arm, wherein the second axis is located between the front end and the rear end of the first arm; a first roller supported on the first roller mount to pivot together with the first roller mount about the second axis; a second arm having a front end and a rear end, wherein the second arm is pivotally coupled to the frame at the rear end to pivot about a generally horizontal and laterally extending third axis, said second arm extending generally forward from the frame; a second roller mount mounted on the first arm to pivot about a generally vertical fourth axis with respect to the second arm, wherein the fourth axis is located between the front end and the rear end of the second arm; and an endless conveyor belt wrapped around the first roller and the second roller such that the belt is driven about the first roller and the second roller in a direction perpendicular to the direction of travel of the draper header through a field harvesting crops; wherein the first roller and the second roller each has a longitudinal rotational axis that extends in a generally fore-and-aft direction; wherein both the first and second rollers can pivot in a clockwise direction about their respective second and fourth axes at the same time and can pivot in a counterclockwise direction about their respective second and fourth axes at the same time.

The force applied by the endless conveyor belt to the front end of the first roller may cause the front end of the first roller to pivot toward the second roller. The force applied by the endless conveyor belt to the rear end of the first roller may cause the rear end of the first roller to pivot toward the second roller. The force applied by the endless conveyor belt to the front end of the second roller may cause the front end of the second roller to pivot toward the first roller. The force applied by the endless conveyor belt to the rear end of the second roller may cause the rear end of the second roller to pivot toward the first roller. The rear end of the first roller may pivot automatically toward the second roller and the front end of the first roller may pivot automatically away from the second roller and the rear end of the second roller may pivot automatically away from the first roller and the front end of the second roller may pivot automatically toward from the first roller when the first arm is pivoted upward with respect to the second arm.

The rear end of the first roller mount may pivot automatically toward the second roller mount and the front end of the first roller mount may pivot automatically away from the second roller mount and the rear end of the second roller mount may pivot automatically away from the first roller mount and the front end of the second roller mount may pivot automatically toward the first roller mount when the first arm is pivoted upward with respect to the second arm. When this occurs, the first roller may pivot with respect to the second roller about the second axis, and the second roller may pivot with respect to the first roller about the fourth axis. When this occurs, the first roller mount may also pivot with respect to the second roller mount about the second axis, and the second roller mount may also pivot with respect to the first roller mount about the fourth axes.

The first arm may have a first range of pivotal motion about the first axis with respect to the frame and wherein the first roller may have a second range of pivotal motion about the second axis with respect to the first arm, and wherein the second arm may have a third range of pivotal motion about the third axis with respect to the frame, and wherein the second roller may have a fourth range of pivotal motion about the fourth axis with respect to the second arm.

BRIEF DESCRIPTION OF THE DRAWINGS

FIG. 1 is a plan view of the draper header mounted on an agricultural combine.

FIG. 2 is a perspective view of the draper header frame.

FIG. 3 is a side view of a typically arm showing a range of movement when pivoted about its rear pivot point.

FIG. 4 is a schematic plan view of the arms of the draper header showing the arrangement of rollers and roller mounts.

FIGS. 5A and 5B show the relative shape of the conveyor belt when the arms on which the conveyor belt is supported are in the same pivotal position with respect to the draper header frame, and when the arms and rollers are in different pivotal positions.

DETAILED DESCRIPTION

As the terms are used herein, "forward", "forwardly", "in front" or similar terms are made in reference to the direction of travel of the agricultural combine and draper header as they travel through the field in a straight line harvesting crop.

The terms "backward", "back", "behind" or similar terms used herein refer to a direction diametrically opposite to the direction of travel. The terms "lateral", "laterally", "side-to-side" and like terms used herein refer to a direction perpendicular to the direction of travel.

FIG. 1 shows an agricultural combine 100 with a draper header 102 mounted thereon. The draper header 102 has a frame 104 that extends laterally and perpendicular to the direction of travel "V" of the combine through the field. The frame supports inner and outer left side conveyors 106, 108, inner and outer right side conveyors 110, 112, and a center conveyor 114. The left and right side conveyors convey a crop inwardly in the direction indicated by the arrow superimposed on the conveyors. The five conveyors 106, 108, 110, 112, and 114 include five endless conveyor belts 118, 120, 122, 124, 126, respectively, that are supported at each of their opposing ends on rollers (FIG. 4).

Crop from the left and right side conveyors is deposited on the center conveyor, which in turn conveys crop rearward in a direction indicated by the arrow into the agricultural combine itself.

Cut crop material passes into the agricultural combine where it is threshed, separated, cleaned, and stored for later conveyance to an accompanying vehicle.

An elongate sickle bar or reciprocating knife 116 is disposed along a leading edge of that draper header to sever the stalks of the crop to be harvested. A reel (removed for clarity) extends across the width of the draper header to deflect the upper portion of the crop whose stalks are severed by the cutter bar rearward and onto the upper surface of conveyors.

A feederhouse 128 is provided on the front of the agricultural combine 100. The draper header 102 is supported on the forward end of the feederhouse 128. Feederhouse 128 is pivotally coupled to the agricultural combine 100 such that the agricultural combine 100 can raise and lower the feederhouse, thereby raising and lowering the draper header 102 with respect to the ground.

FIG. 2 shows the frame 104 in greater detail. The conveyors and the elongate reciprocating knife 116 of FIG. 1 have been removed for clarity to show the arrangement of the arms 202.

A center section 200 of the frame 104 is supported on feederhouse 128 of the agricultural combine. A plurality of arms 202 are pivotally coupled to a lower portion of frame 104 at the rear ends of the arms and extend forward therefrom. Arms 202 are generally equidistantly spaced in a lateral direction. They are coupled to frame 104 at pivot joints 204.

Pivot joints 204 pivot about pivotal axes that are coaxial with an elongate pivotal axis 206. Pivotal axis 206 extends horizontally and extends perpendicular to the direction of travel of the agricultural combine "V".

FIG. 3 illustrates the motion of the arms as they pivot about their pivot joints 204 and pivotal axis 206. One arm 202A is shown in a relaxed position in which it extends generally forward from the frame 104. The other arm 202B is shown in a pivoted position (which is exaggerated to show the difference between the two positions more obviously). The pivoted position of arm 202B it would achieve when it is pivoted upward by an up-thrust in the ground. These two positions can be achieved by any two adjacent arms 202. The actual position of the arms depends on the terrain over which the draper header 102 passes.

The two adjacent arms 202A, 202B support rollers 300, 302, respectively, that carry opposite ends of an endless belt (see FIG. 1).

When one arm (e.g. 202B) is pivoted with respect to the other arm (e.g. 202A) the distance between the forward ends of the rollers (shown here as distance "S1") increases significantly. The distance between the rear ends of the rollers (shown here as distance "S2") also increases, but to a lesser extent.

Notice also that roller 302 also shifts rearwardly when it pivots upward at its forward end. The effect of this rearward shifting is to distort the conveyor belt supported on the rollers 300, 302 into a generally parallelogram shape as shown in exaggerated form (for ease of illustration and explanation) in FIG. 5.

Referring now to FIG. 5A, one of the conveyor belts 500 (exemplary of any of conveyor belts 118, 120, 122, 124) is shown in a generally rectangular configuration. It is supported at each of its extreme ends on a roller, here shown as rollers 300, 302. Rollers 300, 302 are exemplary of any of the rollers (see FIG. 4) at opposing ends of conveyors 106, 108, 110, 112, and 114 and that support endless conveyor belts 118, 120, 122, and 124.

When one of the arms 202 pivots upward, as shown, for example, in FIG. 3, the conveyor belt supported on rollers is initially stretched into a generally parallelogram shape, as shown in exaggerated form) in FIG. 5B. This occurs due to the pivot axis 206 being disposed below and behind the midpoint of the web of the conveyor belt where it wraps around the rollers that support the belt.

But for that mutual pivoting of adjacent rollers supporting a conveyor belt, the location of the pivot axis 206 and the resultant stretching of the belt into a parallelogram shape would significantly increase the tension in the belt in the diagonal direction "A". It would also decrease the tension in the belt in the diagonal direction "B". Indeed, were it not for the mutual pivoting of adjacent rollers, the tension in the diagonal direction "B" could be so great that the belts do not even contact rollers 300, 302 at corners 304, 306 of the belt.

Compounding the front-to-rear shifting, the lifting of one arm with respect to the other arm (see FIG. 4) also significantly increases the tension across the front edge of the belt (in the direction "D") and increases the tension across the rear edge of the belt (in the direction "E") although to a lesser extent.

It is the rollers that apply these uneven forces to the belt as the arms pivot up and down. Due to the mounting of the rollers above the arms, these uneven forces cause the pair of rollers supporting each conveyor belt to pivot with respect to the arms on which they are supported until the tensions across the width of the belt are substantially relaxed and distributed substantially evenly across the width of the belt.

When the arm supporting roller 302 pivots upward with respect to roller 300, the rollers 300, 302 supporting the belt automatically pivot into the roller positions 508, 506 shown in FIG. 5B. When rollers 302, 300 are in the positions 506, 508, the belt reverts to a more rectangular shape (shown in dashed lines in FIG. 5B) as opposed to its initial (and unevenly stressed) parallelogram shape (shown in solid lines in FIG. 5B). The diagonal forces acting on a roller are also made more equal.

The rectification of the belt shape to a more rectangular shape and the balancing of the forces across the web of the belt requires the simultaneous pivoting of the rollers at both ends of the belt. These rollers must pivot in the same direction about their roller pivot axes (i.e. the axes about which each of the rollers pivots with respect to the arm on which it is supported).

As the arms pivot up and down, the roller pivot axis about which the rollers pivot with respect to the arms also pivots with the arm. Thus pivoting the arm that supports roller 302 upward with respect to the arm that supports roller 300 causes the rear end of roller 302 to pivot toward roller 300 and the front end of roller 302 to pivot away from roller 300. At the same time, the rear end of roller 300 pivots away from roller 302, and the front end of a roller 300 pivots toward roller 302.

This pivoting of the rollers with respect to the arms is caused by the uneven diagonal tension in the belt itself, and is not caused by an external arrangement of actuators, sensors, or other devices. This pivoting of the rollers with respect to the arms continues until either the rollers reach some maximum pivotal position (e.g. when one or more of the rollers contacts some mechanical stop) or when the tension across the belt (in a fore-and-aft direction) is equalized.

It should be clear that just as roller 302 and arm 202B on which it is mounted can pivot upward with respect to roller 300 and arm 202A, the converse is true as well: roller 300 and arm 202A can pivot upward above roller 302 and arm 202B in mirror image fashion. Further, both rollers can pivot exactly the same amount. In this trivial case, however, no unequal tension would be generated in the belt (since rollers 300, 302 would not move with respect to each other) and the belt therefore would not experience any unequal tension and be forced to assume a parallelogram shape.

FIG. 4 illustrates the arrangement of the arms 200 and the conveyors supported above the arms that permit the conveyor belts to assume a more-rectangular orientation as shown in FIGS. 5A and 5B.

In FIG. 4, the conveyors are shown with their endless conveyor belts in phantom lines in order to illustrate the rollers that support the belts and the roller mounts that hold the belts and permit the rollers to pivot to relieve the tension in the belts as discussed above in conjunction with FIGS. 5A and 5B.

Referring now to FIG. 4, rollers 400, 402 support conveyor belt 118 at the opposing ends of belt 118. Rollers 404, 406 support conveyor belt 120 at the opposing ends of belt 120. Rollers 408, 410 support conveyor belt 124 at opposing ends of conveyor belt 124. Rollers 412, 414 support conveyor belt 122 at opposing ends of conveyor belt 122. Roller 402 is driven by motor 416. Roller 404 is driven by motor 418. Roller 410 is driven by motor 420. Roller 412 is driven by motor 422. The conveyor belts extend across and are disposed above the arms. The rollers themselves are supported on the arms. Each roller is supported at its forward end and its rear end by a roller mount 401, shown in schematic fashion. Each roller mount 401 permits its corresponding roller to rotate about the longitudinal axis of the roller. As is apparent to those skilled in the art, each roller mount would have a frame extending beyond the axial ends of each roller as shown in FIG. 4 and a journaling device, such as a bearing that guides the roller in the rotational movement described above.

The roller mounts 401 are supported for pivoting about their respective pivot joints 424, 426, 428, 430, 432, 434, 436, and 438 by bearing assemblies 424a, 426a, 430a, 432a, 434a, 436a and 438a. These pivot joints constrain their respective roller mounts 401 and hence the rollers mounted on each respective roller mount 401 to pivot about a corresponding roller mount pivot axis that is located at each of the pivot joints as shown here. Each roller pivot axis is generally perpendicular to the top surface of the belt and to the top surface of the arm. As is apparent to those skilled in the art, the pivotal mounting for each roller mount 401 about their respective axis may be accomplished by the bearing assemblies 424a, 426a, 430a, 432a, 434a, 436a and 438a permitting limited rotational motion. As the arms pivot up and down about pivot axis 206, the roller mount 401 on that arm also pivots up and down with the arm. In a similar fashion, the pivot joint for that roller mount 401 also pivots up and down with the arm, and the roller pivot axis itself also pivots with the arm.

The roller mounts 401 allow the rollers to respond to unequal tensions applied to their forward ends and their rear ends by the belts by rotating about their pivot joints. This pivotal movement of the rollers is illustrated in FIG. 5B and was discussed above.

By locating the roller pivot axis for each roller mount (and roller) between the front and rear of that roller, unequal forces acting on each end of the roller will cause the tensions in the conveyor belt to equalize across the width of the conveyor belt and for the tensions due to the all arms pivoting up and down to be relieved by the rollers moving as shown in FIG. 5B.

It is important that both ends of the conveyor belt be permitted to pivot about the roller pivot axis as shown in FIG. 5B. Only by permitting both ends of the conveyor belt to simultaneously pivot in the same direction about the roller pivots axes at each end of the belt can the stresses in the conveyor belt be significantly reduced (e.g. can the conveyor belt be permitted to achieve a more rectangular orientation on the rollers). To do this it is necessary that the roller mounts, and the rollers that support the ends of the belts are both permitted to pivot with respect to each other sufficiently to permit the belt to assume a generally rectangular shape.

When one of the arms on which a first one of the rollers 300, 302 is located pivots upwards with respect to the other arm supporting a second one of the rollers 300, 302, the front of the first roller (and hence the front of the roller mount for the first roller as well) will pivot toward the 2 roller. The rear end of the first roller (and hence the rear end of the roller mount for the first roller as well) will pivot away from the second roller.

At the same time, the front end of the second roller (and hence the front of the roller mount of the second roller as well) will pivot away from the first roller, and the rear end of the second roller (and hence the rear of the roller mount of the second roller as well) will pivot toward the first roller.

Both of the rollers 300, 302 are therefore permitted to rotate in the same rotational direction about their respective roller pivotal axes (i.e. both clockwise or both counterclockwise) in order to resolve the shape of the conveyor belt into a rectangle.

Each of the arms has a range of pivotal motion about axis 206 with respect to the frame beyond which it is mechanically not permitted to move. The arm hits a stop, or is otherwise constrained from further movement. Each of the rollers and their associated roller mounts also has a range of pivotal motion about its respective roller pivotal axis beyond which it likewise is not permitted to pivot.

To permit the conveyor belt to resolve into a rectangular shape was no residual tension, both of the rollers 300, 302 must be permitted to respond fully to the uneven tension in the belt. They can only do this by giving them a range of pivotal motion around their respective roller pivot axes such that even when the arms are pivoted as far apart as possible, the rollers are free to pivot under the unequal tension forces in the belt around their roller pivot axes until they can resolve this tension without being pressed against a stop. If the roller mounts do hit a stop when the tension in the belt that apps to rectify the belt shape into a rectangle, it means that the roller mounts (by hitting the stop) are preventing the belt from doing all that it can do to equalize the tension in the belt.

In a preferred arrangement, therefore, the arms 202 are provided a range of motion with respect to the frame about axis 206 and the roller mounts (and hence the rollers) are provided with a range of motion with respect to their respective arms such that when the arms reach the opposing limits of their range of motion in normal operation, the unequal tensions in the conveyor belt can still automatically adjust the rollers that support both ends of the belt without the roller mounts abutting a stop.

The invention claimed is:

1. A draper header comprising:
    a frame that is elongate and extends laterally;
    a plurality of arms having a front end and a rear end, wherein each of said plurality of arms extends in a forward direction and is pivotally coupled to the frame at its rear end such that each arm is constrained to pivot up and down at its front end with respect to the frame;

a plurality of rollers, wherein each roller of said plurality of rollers has a longitudinal rotational axis, a front end and a rear end, wherein each roller is mounted on a corresponding arm of the plurality of arms to pivot up and down together with the corresponding arm, wherein the longitudinal rotational axis of each roller extends in a generally fore-and-aft direction;

a plurality of roller mounts for supporting a corresponding one of the plurality of rollers, wherein each roller mount of said plurality of roller mounts is pivotally coupled to the corresponding arm to pivot about a roller mount pivotal axis with respect to the corresponding arm, and wherein said roller mount pivotal axis extends generally vertically and perpendicular to the longitudinal rotational axis; and an endless conveyor belt, wherein said belt has a first end loop wrapped around a first roller of the plurality of rollers and a second end loop wrapped around a second roller of the plurality of rollers, such that the belt is driven about the first roller and the second roller in a direction perpendicular to the direction of travel of the draper header through a field harvesting crops;

wherein the first and second rollers are supported on corresponding roller mounts such that the first roller pivots about the pivotal axis of the arm on which it is mounted and the second roller pivots about the roller mount pivotal axis on the arm on which it is mounted such that both the first and second rollers can simultaneously pivot about their respective roller mount pivotal axes in the same direction at the same time.

2. The draper header of claim 1, wherein a motor is drivingly coupled to the rear end of the first roller to drive the first roller in rotation.

3. The draper header of claim 1, wherein each of the plurality of rollers is configured to pivot together with a roller mount to which it is mounted about a pivotal axis of the roller mount to which it is mounted.

4. The draper header of claim 1, wherein the pivotal axis of the first roller is disposed in a fore-and-aft position between the rear end of the first roller and the front end of the second roller, and further wherein the pivotal axis of the second roller is disposed in a fore-and-aft position between the rear end of the second roller and the front end of the second roller.

5. The draper header of claim 1, wherein force applied by the endless conveyor belt to the front end of the first roller causes the front end of the first roller to pivot toward the second roller, wherein force applied by the endless conveyor belt to the rear end of the first roller causes the rear end of the first roller to pivot toward the second roller, wherein force applied by the endless conveyor belt to the front end of the second roller causes the front end of the second roller to pivot toward the first roller, and wherein force applied by the endless conveyor belt to the rear end of the second roller causes the rear end of the second roller to pivot toward the first roller.

6. An agricultural harvester comprising:
a self-propelled agricultural vehicle; and
an agricultural header mounted on the front of the agricultural vehicle, the agricultural header further comprising,
a frame that is elongate and extends laterally;
a plurality of arms having a front end and a rear end, wherein each of said plurality of arms extends in a forward direction and is pivotally coupled to the frame at its rear end such that each arm is constrained to pivot up and down at its front end with respect to the frame;

a plurality of rollers, wherein each roller of said plurality of rollers has a longitudinal rotational axis, a front end and a rear end, wherein each roller is mounted on a corresponding arm of the plurality of arms to pivot up and down together with the corresponding arm, wherein the longitudinal rotational axis of each roller extends in a generally fore-and-aft direction;

a plurality of roller mounts, wherein each roller mount of said plurality of roller mounts is pivotally coupled to the corresponding arm to pivot about a roller mount pivotal axis with respect to said arm, and wherein said roller mount pivotal axis extends generally vertically and perpendicular to the longitudinal rotational axis; and an endless conveyor belt, wherein said belt has a first end loop wrapped around a first roller of the plurality of rollers and a second end loop wrapped around a second roller of the plurality of rollers, such that the belt is driven about the first roller and the second roller in a direction perpendicular to the direction of travel of the draper header through a field harvesting crops;

wherein the first and second rollers are supported on corresponding roller mounts such that the first roller pivots about the pivotal axis of the arm on which it is mounted and the second roller pivots about the roller mount pivotal axis on the arm on which it is mounted such that both the first and second rollers can simultaneously pivot in the same direction about their respective pivotal axes in the same direction at the same time.

7. A draper header comprising:
a frame that is elongate and extends laterally;
a first arm having a front end and a rear end, wherein the first arm is pivotally coupled to the frame at the rear end to pivot about a generally horizontal and laterally extending first axis, said first arm extending generally forward from the frame;
a first roller mount mounted on the first arm to pivot about a generally vertical second axis with respect to the first arm, wherein the second axis is located in a first fore-and-aft position between the front end and the rear end of the first arm;
a first roller supported on the first roller mount to pivot together with the first roller mount about the second axis;
a second arm having a front end and a rear end, wherein the second arm is pivotally coupled to the frame at the rear end to pivot about a generally horizontal and laterally extending third axis, said second arm extending generally forward from the frame;
a second roller mount mounted on the first arm to pivot about a generally vertical fourth axis with respect to the second arm, wherein the fourth axis is located in a second fore-and-aft position between the front end and the rear end of the second arm; and
an endless conveyor belt wrapped around the first roller and the second roller such that the belt is driven about the first roller and the second roller in a direction perpendicular to the direction of travel of the draper header through a field harvesting crops;
wherein the first roller and the second roller each has a longitudinal rotational axis that extends in a generally fore-and-aft direction;
wherein both the first and second rollers are supported on the first and second arms to pivot in a clockwise direction about their respective second and fourth axes at the same time and can pivot in a counterclockwise direction about their respective second and fourth axes at the same time.

8. The draper header of claim 7, wherein force applied by the endless conveyor belt to the front end of the first roller causes the front end of the first roller to pivot toward the second roller, wherein force applied by the endless conveyor belt to the rear end of the first roller causes the rear end of the first roller to pivot toward the second roller, wherein force applied by the endless conveyor belt to the front end of the second roller causes the front end of the second roller to pivot toward the first roller, and wherein force applied by the endless conveyor belt to the rear end of the second roller causes the rear end of the second roller to pivot toward the first roller.

9. The draper header of claim 7, wherein the rear end of the first roller pivots automatically toward the second roller and the front end of the first roller pivots automatically away from the second roller and wherein their rear end of the second roller pivots automatically away from the first roller and the front end of the second roller pivots automatically toward from the first roller when the first arm is pivoted upward with respect to the second arm.

10. The draper header of claim 7 wherein the rear end of the first roller mount pivots automatically toward the second roller mount and the front end of the first roller mount pivots automatically away from the second roller mount and wherein the rear end of the second roller mount pivots automatically away from the first roller mount and the front end of the second roller mount pivots automatically toward the first roller mount when the first arm is pivoted upward with respect to the second arm.

11. The draper header of claim 9 wherein the first roller pivots with respect to the second roller about the second axis, and wherein the second roller pivots with respect to the first roller about the fourth axis.

12. The draper header of claim 10 wherein the first roller mount pivots with respect to the second roller mount about the second axis, and wherein the second roller mount pivots with respect to the first roller mount about the fourth axes.

13. The draper header of claim 7 wherein the first arm has a first range of pivotal motion about the first axis with respect to the frame and wherein the first roller has a second range of pivotal motion about the second axis with respect to the first arm, and wherein the second arm has a third range of pivotal motion about the third axis with respect to the frame, and wherein the second roller has a fourth range of pivotal motion about the fourth axis with respect to the second arm.

* * * * *